United States Patent [19]

Kaneko

[11] 4,005,259

[45] Jan. 25, 1977

[54] SIGNAL REPRODUCING SYSTEMS EMPLOYING A SEMICONDUCTIVE LIGHT SOURCE

[75] Inventor: Takeo Kaneko, Yokohama, Japan

[73] Assignee: Sony Corporation, Tokyo, Japan

[22] Filed: Feb. 4, 1975

[21] Appl. No.: 546,996

[30] Foreign Application Priority Data

Feb. 12, 1974 Japan .................................. 49-17017

[52] U.S. Cl. ........................... 358/128; 358/130; 179/100.3 Z; 179/100.3 V; 250/552; 250/570; 357/18

[51] Int. Cl.² .................... G11B 7/00; H01S 3/10

[58] Field of Search ....... 178/6.6 R, 6.6 DD, 6.7 A; 179/100.3 Z, 100.3 V, 100.41 L; 250/552, 555, 566, 570; 346/76 L; 357/18, 19, 17

[56] References Cited

UNITED STATES PATENTS 3,798,386 3/1974 Dickopp .................... 179/100.3 N
3,941,945 3/1976 Borner ....................... 179/100.3 Z Primary Examiner—Bernard Konick
Assistant Examiner—Alan Faber
Attorney, Agent, or Firm—Lewis H. Eslinger; Alvin Sinderbrand

[57] ABSTRACT

A signal reproducing system using light for reproducing video or other information signals recorded on a recording medium, such as a rotatable disc, employs a semiconductor diode laser for directing the light to the recording medium which has reflective portions and nonreflective portions representing the recorded signals. A cleavage face of the semiconductor diode has an antireflecting coating through which the light is directed toward the recording medium so that the semiconductor diode laser emits laser light only when the semiconductor diode laser receives the reflection from the reflective portions of the recording medium, and a transducer receives the laser light emitted from another cleavage face of the semiconductor diode laser to reproduce the recorded signals in response to the emitted laser light.

12 Claims, 9 Drawing Figures

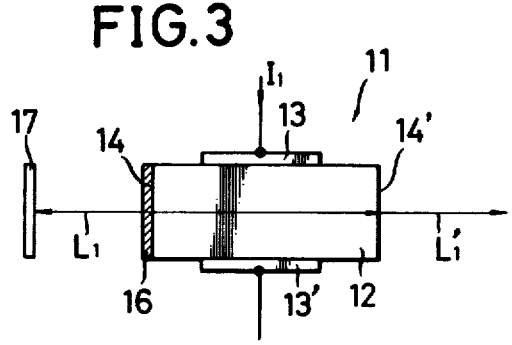
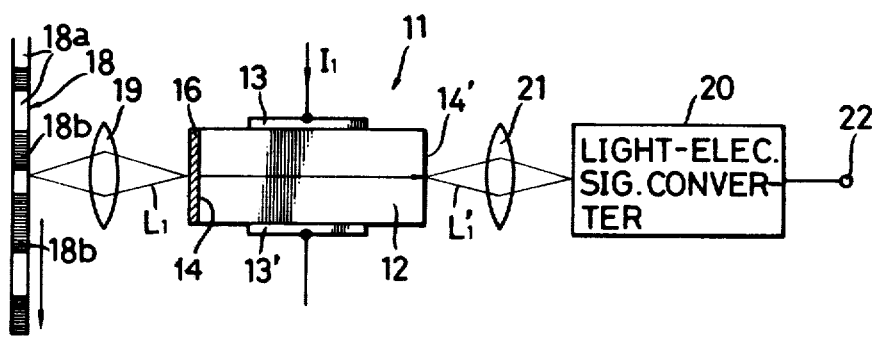
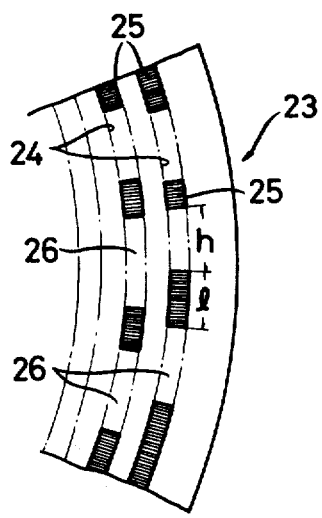

SIGNAL REPRODUCING SYSTEMS EMPLOYING A SEMICONDUCTIVE LIGHT SOURCE

BACKGROUND OF THE INVENTION

1. Field of the Invention

This invention relates generally to signal reproducing systems that use light for reproducing information signals recorded on a recording medium, and more particularly is directed to improvements in reproducing systems, as aforesaid, in which a semiconductor diode laser device is used to supply the light for reproducing the recorded signals.

2. Description of the Prior Art

Systems have been proposed some for reading out information recorded mechanically or optically on the surface of a recording medium, for example, a disc or plate, by scanning the surface of the recording medium with light and detecting the reflection from the surface of the recording medium. In such systems, solid-state lasers, such as the ruby laser, or gas lasers, such as the He-Ne laser, have been employed as a light source to supply the light for scanning the recording medium. These lasers are relatively large and, therefore, the reproducing apparatus for such conventional systems become very large and have to be provided with many mirrors or prisms to guide the light to the recording medium from the laser with the intention of possibly minimizing the size of the apparatus. This results in an apparatus that is expensive and very complicated in addition to being large in size. Further, in the conventional systems the reflection from the surface of the recording medium is received by a light sensitive device to detect changes in intensity of the reflection so that the recorded signals are reproduced in response to the changes in intensity of the reflection. Accordingly, it is further required to provide a complicated and expensive optical system to obtain reproduced signals with a satisfactory S/N ratio.

OBJECTS AND SUMMARY OF THE INVENTION

It is an object of the present invention to provide a signal reproducing system using light for reading out information signals recorded on a recording medium and in which the above mentioned defects inherent in the prior art are avoided.

Another object of the present invention is to provide a compact signal reproducing system using the light of a laser for reading out information signals recorded on a recording medium.

A further object of the present invention is to provide a novel signal reproducing system utilizing a semiconductor diode laser for reproducing signals recorded on a recording medium.

Still another object of the present invention is to provide a novel signal reproducing system utilizing a semiconductor diode laser which is suitable for reproducing video signals recorded on a rotatable disc.

In accordance with an aspect of the invention, the video or other information is recorded as reflective and non-reflective portions of a recording medium, and the apparatus for reproducing such information comprises a semiconductor laser device including a semiconductor PN junction diode having opposed cleavage faces crossing the plane of the PN junction and one of which is directed toward the recording medium, a current source supplying a bias current to the diode for causing the latter to radiate light from its PN junction and an antireflecting coating on at least said one cleavage face of the diode to guide the light radiated from the PN junction for scanning of the reflective and non-reflective portions of the recording medium and to receive the light reflected from the reflective portions so as to cause the emission of laser light by the diode through the other of the cleavage faces thereof only in response to reception of such reflected light, and means, such as a photo-electric transducer, for receiving the laser light emitted from said other cleavage face and coverting the same to recorded video or other information.

The above, and other objects, features and advantages of the present invention will become apparent from the following description taken in conjunction with the accompanying drawings.

BRIEF DESCRIPTION OF THE DRAWINGS

FIG. 3 is a schematic diagram showing the basic components of a semiconductor diode laser employed in accordance with the present invention;

FIG. 4 is a schematic diagram showing a signal reproducing system using light for reproducing recorded signals according to one embodiment of the present invention;

FIG. 5 is a schematic plan view showing a portion of a record disc on which video signals are recorded for reproduction or playback by a system according to this invention;

DESCRIPTION OF THE PREFERRED EMBODIMENTS

Figure 1:
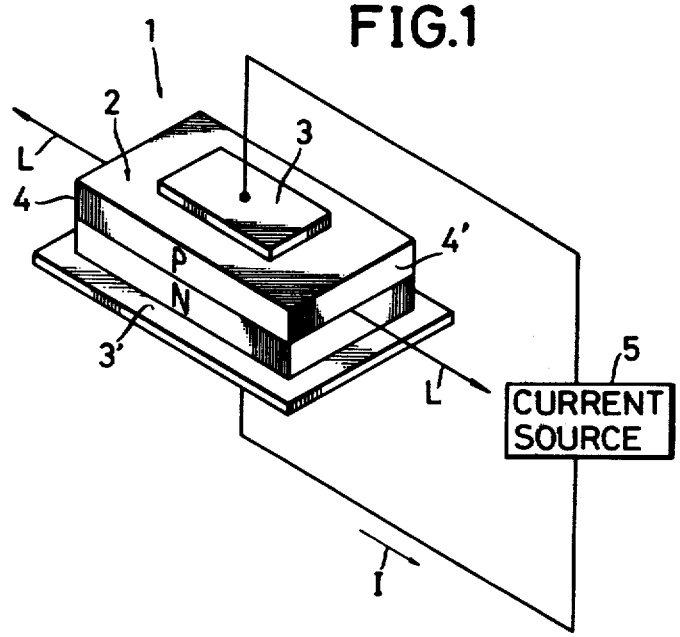
FIG. 1 is a schematic perspective view of an existing semiconductor diode laser.

Referring first to FIG. 1, it will be seen that a semiconductor diode laser 1 comprises a PN junction diode 2 made of GaAs or the like as is well known. Electrodes 3 and 3' are fixed to opposite sides of the diode 2. A bias current source 5 is connected to the electrodes 3 and 3'. The diode 2 has opposed cleavage faces 4 and 4' with a suitable reflection rate.

Figure 2A:
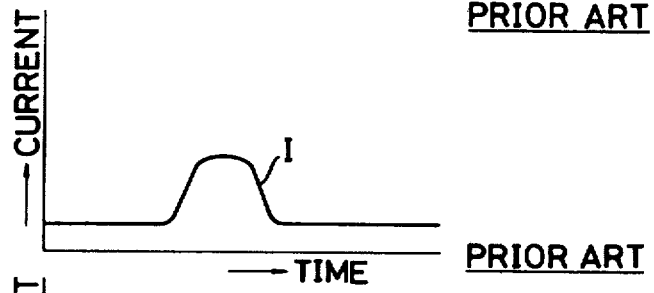
FIGS. 2A and 2B are schematic wave forms used for explanation of the operation of the semiconductor diode laser shown in FIG. 1.
Figure 2B:
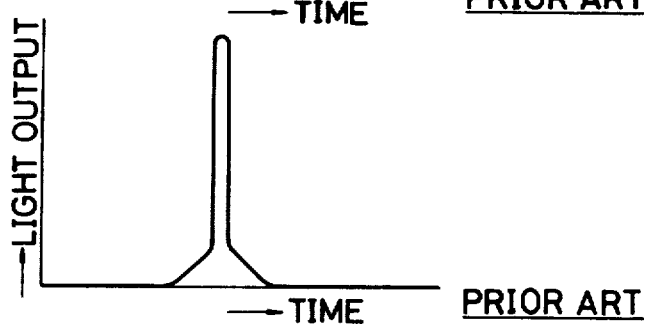

When a forward current I, as shown on FIG. 2A, is supplied to the diode 2 from the bias current source 5 through the electrodes 3 and 3', carriers are injected into the diode 2 and light is generated in response to the recombination in a depletion layer formed adjacent to the PN junction. The light is repeatedly reflected by the opposite cleavage faces 4 and 4' to resonate to a high energy level. The amplified light, that is, laser light L, is emitted through the cleavage faces 4 and 4'. FIG. 2B shows a wave form of the emitted laser light L.

Since a resonator is formed by the semiconductor diode laser in which the cleavage faces 4 and 4' function as reflectors, it is impossible to control the emission of the laser light L by external adjustment of Q-value of resonance.

Generally, in a laser light emitting semiconductor device to be used in a system according to the present invention, an antireflection coating is formed on at least one of the cleavage faces of the semiconductor diode laser shown on FIG. 1, and a recording medium is arranged opposite to the antireflection coating at a predetermined distance from the antireflection coating and has reflective surfaces and non-reflective surfaces to represent the recorded signals. The emission of laser light from the laser light emitting semiconductor device can be controlled by the reflective surfaces and the non-reflective surfaces of the recording medium. Thus, recorded signals can be effectively read out from various recording media, such as a disc, on which video signals are recorded.

More particularly, as shown on FIG. 3, in a system for reading out signals according to the present invention, a semiconductor laser 11 comprises a PN junction diode 12 made of GaAs, as in FIG. 1, with electrodes 13 and 13' being fixed to opposite sides of the diode 12 and an antireflection coating 16 being formed on one cleavage face 14. The antireflection coating 16 is formed by coating the cleavage face with siO glass to the thickness corresponding to one fourth of the wave length of the emitted light. The reflection rate of the antireflection coating 16 can be nearly zero.

If a reflector 17 is arranged at a predetermined distance from antireflection coating 16 and a forward current $I_1$, is supplied to the diode 12 through the electrodes 13 and 13', the light $L_1$ emitted through the cleavage face 14 is reflected by the reflector 17 so as to resonate, and a laser light $L_1'$ is emitted through the other or opposed cleavage face 14'. Accordingly, the Q-value of resonance can be controlled by varying the reflection rate of the reflector 17, and therefore the emission of the laser light $L_1'$ can be ON-OFF controlled.

FIG. 4 shows a system for reading out information signals according to the present invention and which uses the semiconductor laser 11 of FIG. 3. Reflective portions 18a and non-reflective portions 18b are arranged in a recording medium 18 at suitable distances from each other to represent the recorded information signals. For example, the recorded information signals may be formed on the surface of a plastic base with the reflective portions 18a being defined by aluminum that is vapor-deposited on the surface of the plastic base. Since the reflected light spreads somewhat, a focus lens 19 is disposed between the recording medium 18 and the antireflection coating 16. The light emitted through antireflection coating 16 also is focussed on the recording medium 18 by the focus lens 19 so as to be effectively reflected by the reflective portions 18a of recording medium 18. A photo-electric transducer or light-electric signal converting device 20 is arranged opposite to the cleavage face 14' of the diode 12 at a predetermined distance from the cleavage face 14'. Another focus lens 21 is disposed between the cleavage face 14' and the light-electric signal converting device 20. An output terminal 22 is connected to the light-electric signal converting device 20. The forward current $I_1$, is continuously supplied to the diode 12 through the electrodes 13 and 13'. The recording medium 18 is moved in the direction shown by the arrow on FIG. 4. whenever a reflective portion 18a passes through the focus of the focus lens 19, the Q-value is at or high level and the resonance is maintained, so that the laser light $L_1'$ is emitted through the cleavage face 14' of the diode 12. On the other hand, whenever a non-reflective portion 18b passes through the focus of the focus lens 19, the Q-value is at a relatively low level and the resonance does not occur, so that the light generated by the recombination in the diode 12 is spontaneously emitted and the laser light is not generated.

The laser light $L_1'$ emitted through the cleavage face 14' in response to each reflective portion 18a is detected by the light-electric signal converting device 20 after passing through the focus lens 21. Thus, digital signals are obtained from the output terminal 22 in accordance with the arrangement of the reflective portions 18a and the non-reflective portions 18b on recording medium 18. A phosphor screen may be substituted for the light-electric signal converting device 20. In that case, the phosphor screen is scanned by the laser light emitted through cleavage face 14' of the diode to produce pictures on the screen.

In the case of the recording medium 18, the reflective portions 18a and the non-reflective portions 18b are distributed along a rectilinear path. Instead of moving the recording medium 18, the semiconductor laser 11 may be moved to scan the path of the reflective and non-reflective portions on recording medium 18 and thereby to obtain information signals from the recording medium 18.

An embodiment will now be described in which the above-described information signal reproducing system is applied to a video disc play back system.

A video disc is known in which PCM signals or FM signals converted from television video signals are recorded on a plastic disc. In such a disc 23, as shown on FIG. 5, mirror surfaces 26 are formed on a plastic disc or base plate by vapor-depositing aluminum thereon. Numerous pits 25 are formed in a spiral track 24 on the video disc 23. The length 1 of the pit 25 and each distance h between the adjoining pits 25 vary with the recorded information signals. The mirror surfaces 26 on the track 24 correspond to the reflective portions 18a in FIG. 4. The pits 25 having rough surfaces correspond to the non-reflective portions 18b in FIG. 4.

Figure 6:
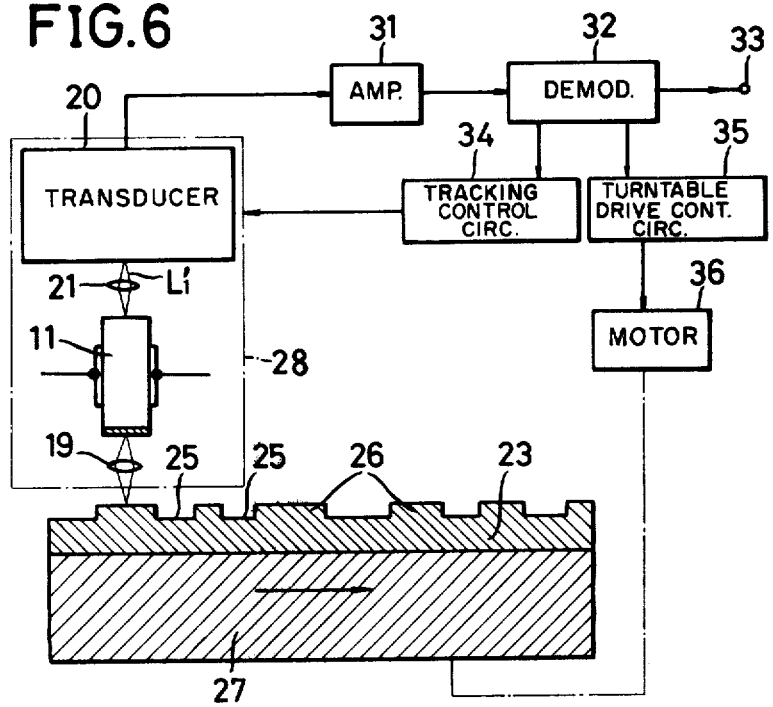
FIG. 6 is a schematic diagram showing one embodiment of a system according to the present invention for reproducing or playing back the video record disc of FIG. 5.

FIG. 6 is a schematic diagram showing one embodiment of a capstan to reproduce or playback the video signals recorded on the video disc 23. In FIG. 6, the video disc 23 is shown in section along the direction of the track 24. The video disc 23 is mounted on a turn table 27 rotated in the direction shown by the arrow on FIG. 6. The semiconductor laser 11 is arranged in a pick up device 28 which is suitably mounted for movement in the radial direction of the disc 23 with the focus of the focus lens 19 lying on the mirror surface 26. The pick up device 28 traces the track 24 by controlling its movement in the radial direction of the turn table 27 as the latter is rotated.

ON-OFF signals are obtained from the light-electric signal converting device or transducer 20 in accordance with the arrangement of the pits 25 on the track 24 of the video disc 23. The ON-OFF signals are applied to a demodulator 32 through an amplifier 31. Thus, video output signals are obtained from an output terminal 33 of the demodulator 32. synchronous signals separated from the demodulator 32 are applied to control circuits 34 and 35. The speed of a driving motor 36 for the turn table 27, and the movement of the pick up device 28 in the radial direction of the turntable are controlled by the control signals obtained from the control circuits 35 and 34, respectively.

Figure 7:
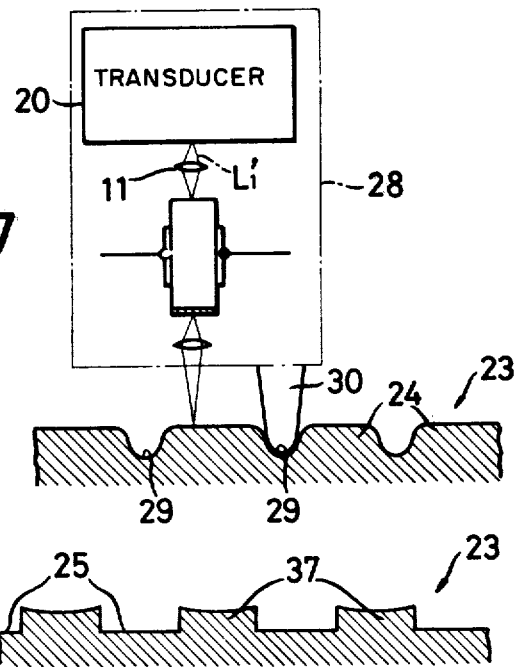
FIG. 7 is a schematic diagram showing a portion of another embodiment of a system for playing back a video record disc according to the present invention.

FIG. 7 shows a portion of another embodiment of a reproducing system according to the invention. In FIG. 7, the video disc 23 is shown in section in its radial direction. In the video disc 23 of this embodiment, a guide groove 29 is formed in parallel with, and adjacent to the track 24. Moreover, a guiding stylus 30 is attached to the pick up device 28 and moves along the guiding groove 29. The engagement of stylus 30 in guiding groove 29 ensures that the pickup device 28 will scan the spiral track 24 on disc 23, and the control circuit 34 of FIG. 6 can be omitted.

Figure 8:
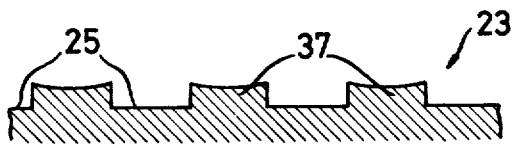
FIG. 8 is a schematic cross-sectional view showing another embodiment of a disc on which video signals are recorded.

FIG. 8 shows another embodiment of a video disc. In this embodiment, the reflective portions formed on the track 24 of the video disc 23 are in the shape of concave mirrors 37 so that the reflection rate can be improved.

According to this invention, since information signals can be read out from the recording medium without mechanical contact, the recording medium does not wear. Moreover, since information signals are read out with the ON-OFF control of the resonance of the laser diode, the difference between the intensities of the laser light incident on the light-electric converting device or transducer 20 and the spontaneously emitted light is large, and therefore a very large signal to noise ratio (S/N) can be realized. Further, the system according to this invention is small-sized and inexpensive.

Although illustrative embodiments of the invention have been described in detail herein with reference to the accompanying drawings it is to be understood that the invention is not limited to those precise embodiments, and that various changes and modifications can be effected therein by one skilled in the art without departing from the scope and spirit of the invention as defined in the appended claims.

What is claimed is:

1. An information reproducing system comprising: a record medium having the information recorded thereon as reflective and non-reflective portions of the record medium; and a pickup device including a semiconductor PN junction diode having opposed side surfaces crossing the plane of said PN junction and at least one of which is non-reflective, means for supplying a bias current to said diode to cause the latter to radiate light from said PN junction, said diode being positioned in respect to said record medium so that light radiated from said PN junction is guided through said one non-reflective side surface to impinge selectively on said reflective and non-reflective portions of the record medium with the light, when reflected by said reflective portions of the record medium, reentering said diode through said one non-reflective side surface, said reflective and non-reflective portions of the record medium having respective reflectivities to cause resonance of said diode and the emission of laser light through the other of said opposed side surfaces only when light impinges on said reflective portions of the record medium, whereby to effect the ON-OFF control of the emission of said laser light in response to the selective impingement of the radiated light on said reflective and non-reflective portions, respectively, of the record mediun, and means receiving said laser light emitted through said other side surface of the diode for converting the same to the recorded information.

2. An information reproducing system according to claim 1; in which said opposed side surfaces are respective cleavage faces of said semiconductor diode, and the cleavage face constituting said one side surface has an antireflecting coating thereon to make the same non-reflective.

3. An information reproducing system according to claim 1; in which said reflective and non-reflective portions of the record medium are disposed along a predetermined path on the record medium; and further comprising means for effecting relative movement of said record medium and pickup device so as to cause the light guided through said one non-reflective side surface of the diode to scan said path on the record medium.

4. An information reproducing system according to claim 3; further comprising focusing lens means interposed between said one non-reflective side surface of the semiconductor diode and said record medium.

5. An information reproducing system according to claim 3; in which said record medium further has a groove extending along said path, and said pickup device has guide means connected therewith and engageable in said groove to cause the scanning of said path by said light guided through the one non-reflective side surface of said semiconductor diode.

6. An information reproducing system according to claim 3; in which said reflective portions of the record medium have concave surfaces for concentrating, at said one non-reflective side surface of the diode, the light reflected by said reflective portions of the record medium.

7. An information reproducing system according to claim 3; in which said record medium has a mirror surface, said non-reflective portions of the record medium are defined by respective pitted areas along said path, and said reflective portions of the record medium are defined by said mirror surface along said path between said pitted areas.

8. An information reproducing system according to claim 1; in which said means receiving the laser light emitted through said other side surface includes photoelectric transducer means.

9. An apparatus for reproducing information recorded in the form of reflective and non-reflective surface portions arranged along a predetermined path on a record medium, said apparatus comprising: support means for said record medium; a pickup device including a semiconductor PN junction diode having opposed cleavage faces with an antireflecting coating on one of said cleavage faces, and means for supplying a bias current to said diode for causing the latter to radiate light from said PN junction thereof, said diode being disposed with said one cleavage face thereof directed toward said support means so that light radiated from said PN junction is directed through said one cleavage face with the antireflecting coating thereon against the surface of a record medium on said support means; means for effecting relative movement of said support means and said pickup device so that the light directed through said one cleavage face scans the path of the reflective and non-reflective surface portions of the record medium on said support means and such light, when impinging on said reflective surface portions, is reflected thereby to reenter said diode through said one cleavage face with the antireflecting coating thereon; said diode being operative to emit laser light through the other of said cleavage faces only when resonance is produced by the reentry of the light reflected from said reflective surface portions of the record medium, whereby to effect ON-OFF emission of said laser light in response to the scanning of the reflective and non-reflective surface portions, respectively, of the record medium; and means receiving said laser light emitted through said other cleavage face for converting the ON-OFF emission of such laser light to the recorded information.

10. An apparatus according to claim 9; further comprising focusing lens means disposed in the path of the light directed through said one cleavage face toward said support means and of the light reflected for reentry into said diode through said one cleavage face.

11. An apparatus according to claim 9; in which the record medium is in the form of a record disc with the path of the reflective and non-reflective surface portions being a spiral on such disc; said support means is a rotatable turntable; and said means for effecting relative movement of the support means and pickup device includes means for rotating said turntable and means for causing movement of said pickup device radially across said turntable.

12. An apparatus according to claim 11; in which the record disc has a groove extending along the spiral path; and said means for causing movement of the pickup device radially across the turntable includes a stylus extending from said pickup device and being engageable in the groove of a record disc on said turntable.

* * * * *